US012607518B2

(12) United States Patent
Yoshito et al.

(10) Patent No.: US 12,607,518 B2
(45) Date of Patent: Apr. 21, 2026

(54) SENSOR UNIT AND SENSOR UNIT-EQUIPPED BATTERY WIRING MODULE

(71) Applicants:AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Daiji Yoshito, Osaka (JP); Hideo Takahashi, Osaka (JP); Hideaki Nakajima, Osaka (JP); Haruka Tadano, Osaka (JP)

(73) Assignees: AUTÓNETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 372 days.

(21) Appl. No.: 18/559,362

(22) PCT Filed: Feb. 11, 2022

(86) PCT No.: PCT/JP2022/005523
§ 371 (c)(1),
(2) Date: Nov. 7, 2023

(87) PCT Pub. No.: WO2022/249573
PCT Pub. Date: Dec. 1, 2022

(65) Prior Publication Data
US 2024/0272008 A1 Aug. 15, 2024

(30) Foreign Application Priority Data
May 26, 2021 (JP) ................................. 2021-088576

(51) Int. Cl.
*G01K 1/14* (2021.01)
*F16F 1/12* (2006.01)
(Continued)

(52) U.S. Cl.
CPC .................. *G01K 1/14* (2013.01); *F16F 1/12* (2013.01); *G01K 1/08* (2013.01); *H01M 10/482* (2013.01);
(Continued)

(58) Field of Classification Search
CPC ... G01K 1/14; G01K 1/08; F16F 1/12; H01M 10/482; H01M 10/486; H01M 50/209;
(Continued)

(56) References Cited

U.S. PATENT DOCUMENTS

| | | |
|---|---|---|
| 2016/0035467 A1 | 2/2016 | Haydin et al. |
| 2017/0207501 A1 | 7/2017 | Haydin et al. |

(Continued)

FOREIGN PATENT DOCUMENTS

| | | |
|---|---|---|
| JP | 55-097243 | 7/1980 |
| JP | 57-059232 | 4/1982 |

(Continued)

OTHER PUBLICATIONS

International Search Report issued in WIPO Patent Application No. PCT/JP2022/005523, dated Apr. 12, 2022, along with an English translation thereof.

*Primary Examiner* — John E Breene
*Assistant Examiner* — Manuel Salvador Castellon, Jr.
(74) *Attorney, Agent, or Firm* — Greenblum & Bernstein, P.L.C.

(57) ABSTRACT

A sensor unit includes: a conductive path structure; a sensor element; a lower housing including a sensor element accommodation part; a coil spring; and an upper housing. The lower housing includes a support portion, and the upper (Continued)

housing includes a positioning protrusion that protrudes in the shape of a tapered tube toward the lower housing, and is inserted into another end of the coil spring in the axial direction. The lower housing is displaceable toward the positioning protrusion, the coil spring includes an engagement projection that projects to the inner circumferential side thereof so as to be deflectable and deformable. The positioning protrusion has a receiving recess, and the engagement projection is received and locked in the receiving recess, so that the coil spring is held by the upper housing.

9 Claims, 9 Drawing Sheets

(51) Int. Cl.

| | |
|---|---|
| *G01K 1/08* | (2021.01) |
| *H01M 10/48* | (2006.01) |
| *H01M 50/209* | (2021.01) |
| *H01M 50/271* | (2021.01) |
| *H01M 50/507* | (2021.01) |

(52) U.S. Cl.
CPC ....... *H01M 10/486* (2013.01); *H01M 50/209* (2021.01); *H01M 50/271* (2021.01); *H01M 50/507* (2021.01)

(58) Field of Classification Search
CPC ............. H01M 50/271; H01M 50/507; H01M 50/204; G01D 11/24; Y02E 60/10
See application file for complete search history.

(56) References Cited

U.S. PATENT DOCUMENTS

| | | | | |
|---|---|---|---|---|
| 2018/0163706 A1* | 6/2018 | Kase | ................. | G03G 21/1647 |
| 2019/0178723 A1 | 6/2019 | Yanagida et al. | | |
| 2020/0333192 A1* | 10/2020 | Takase | .................... | G01K 1/18 |

FOREIGN PATENT DOCUMENTS

| | | |
|---|---|---|
| JP | 06-004441 | 1/1994 |
| JP | 08-256909 | 10/1996 |
| JP | 2011-060675 | 3/2011 |
| JP | 2019-002892 | 1/2019 |
| JP | 2020-187137 | 11/2020 |
| WO | 2017/221707 | 12/2017 |

* cited by examiner

Front

Left ← → Right

Rear

Up

Rear ← → Front

Down

Front

Right ←——→ Left

Rear

SENSOR UNIT AND SENSOR UNIT-EQUIPPED BATTERY WIRING MODULE

TECHNICAL FIELD

The present disclosure relates to a sensor unit and a sensor unit-equipped battery wiring module.

BACKGROUND ART

Patent Document 1 discloses a sensor unit to be attached to a detection target. The sensor unit includes: a sensor element connected to a surface of a band-shaped and flexible conductive path structure; a lower housing having a sensor element accommodation part that surrounds the sensor element and is fixed to a surface of the conductive path structure; and a coil spring that biases the lower housing toward the detection target. One end of the coil spring in an axial direction is held by the lower housing, and the other end is interposed between the lower housing and an upper housing, the upper housing being attached to the lower housing with the coil spring interposed therebetween in the axial direction of the coil spring. Also, the lower housing is displaceable toward the upper housing in response to an elastic deformation of the coil spring that shrinks in the axial direction, and the lower housing is configured to be biased and pressed toward the detection target in response to the elastic recovery of the coil spring.

CITATION LIST

Patent Document

Patent Document 1: JP 2020-187137A

SUMMARY OF INVENTION

Problem to be Solved by Present Disclosure

Meanwhile, in the sensor unit of Patent Document 1, one end of the coil spring in the axial direction is received in a recess in the lower housing that is open to the upper housing, and a positioning protrusion protruding from the upper housing toward the sensor receiving part is inserted into the other end of the coil spring in the axial direction. Accordingly, before assembly of the lower housing and the upper housing, the coil spring is not held by the lower housing or the upper housing, and thus there may be a likelihood that the coil spring will be lost during the assembly of the sensor unit. Furthermore, since the coil spring is not held by the lower housing or the upper housing, the operation for assembling the sensor unit may be complicated, and thus further improvements are under consideration.

Disclosed are a sensor unit and a sensor unit-equipped battery wiring module that make it possible to reduce the likelihood that a coil spring will be lost, and improve the workability in assembling the sensor unit.

Solution to Problem

A sensor unit according to the present disclosure is a sensor unit including: a band-shaped and flexible conductive path structure including a laminated conductor and an insulating film that covers the conductor; a sensor element that is arranged on a surface of the conductive path structure and is connected to the conductor; a lower housing including a sensor element accommodation part that surrounds the sensor element and is fixed to the surface of the conductive path structure; a coil spring configured to bias the lower housing toward a detection target; and an upper housing that is attached to the lower housing with the coil spring interposed therebetween in an axial direction of the coil spring, wherein the lower housing includes a support portion supporting an end portion of the coil spring in the axial direction, the upper housing includes a positioning protrusion that protrudes in the shape of a tapered tube toward the lower housing, and is inserted into another end of the coil spring in the axial direction, the lower housing is displaceable toward the positioning protrusion in response to an elastic deformation of the coil spring that shrinks in the axial direction, and is biased toward the detection target in response to elastic recovery of the coil spring, the other end of the coil spring has an engagement projection formed by a bare wire of the coil spring protruding to an inner circumferential side of the coil spring so as to be deflectable and deformable, the positioning protrusion has, in a base end portion thereof, a receiving recess that is open in an outer circumferential surface of the positioning protrusion and is recessed to an inner circumferential side, and in which the engagement projection is received and locked, and due to deflection and deformation of the engagement projection, the positioning protrusion is allowed to be inserted into the coil spring, and due to elastic recovery of the engagement projection, the engagement projection is received and locked in the receiving recess, and the coil spring is held by the upper housing.

A sensor unit-equipped battery wiring module according to the present disclosure is a sensor unit-equipped battery wiring module configured to be mounted to a battery cell group in which a plurality of battery cells are lined up, the sensor unit-equipped battery wiring module including: a plurality of busbars electrically connected to the battery cell group; an insulating case in which the plurality of busbars are received; and a cover part that is mounted on the case and covers the plurality of busbars, wherein the sensor unit according to the present disclosure is used as a sensor unit, the case includes a sensor unit arrangement region configured to be arranged on at least one battery cell that is a detection target, and in the sensor unit arrangement region, the sensor unit is arranged in a state in which a rear surface of the conductive path structure opposite to a position at which the sensor element is mounted is accessible to the battery cell.

Advantageous Effects of Present Disclosure

According to the sensor unit and the sensor unit-equipped battery wiring module of the present disclosure, it is possible to reduce the likelihood that a coil spring will be lost, and improve the workability in assembling the sensor unit.

DESCRIPTION OF EMBODIMENTS

Description of Embodiments of Present Disclosure

Figure 1:
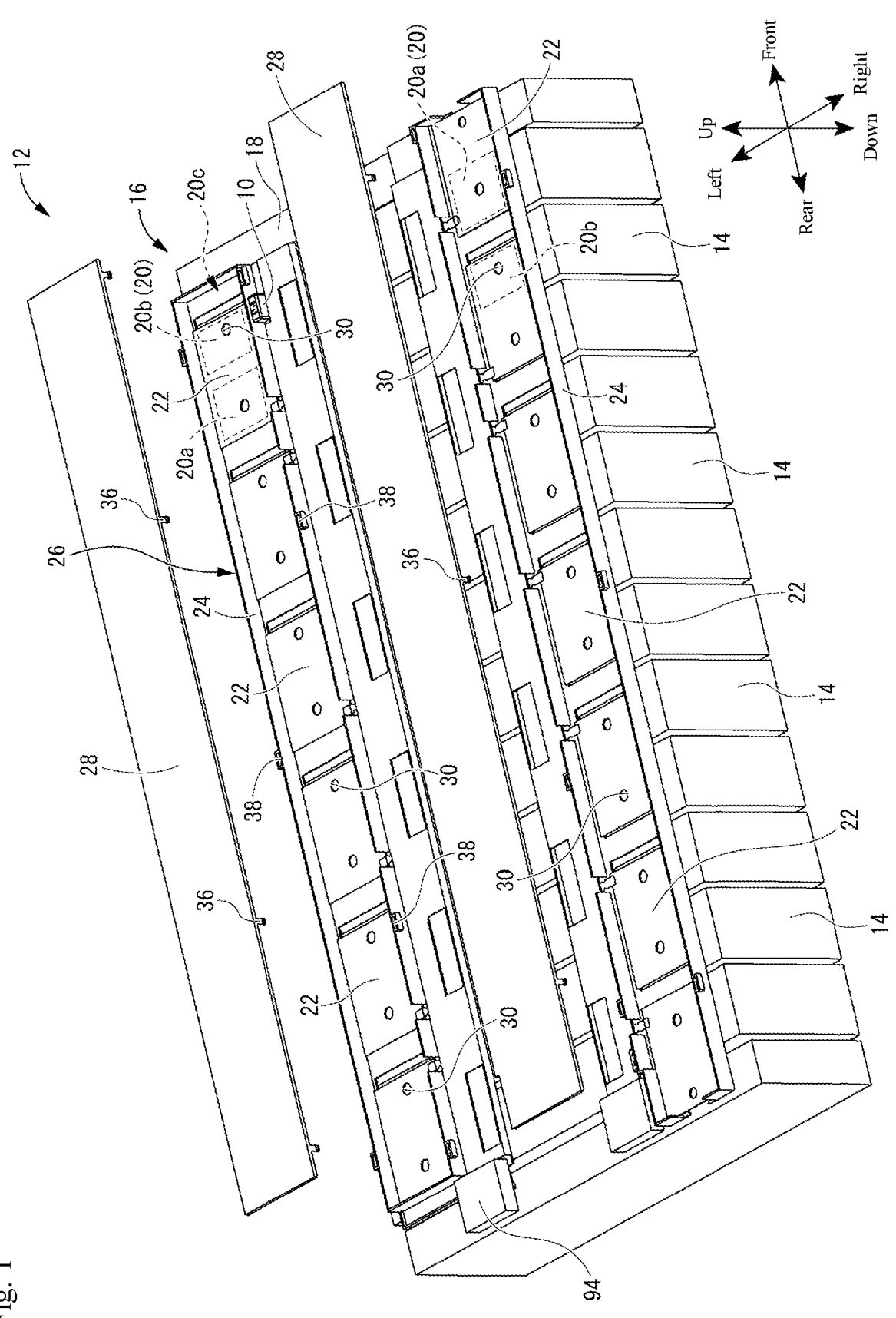
FIG. 1 is a perspective view illustrating the entire sensor unit-equipped battery wiring module according to Embodiment 1 attached to a battery cell group.
Figure 2:
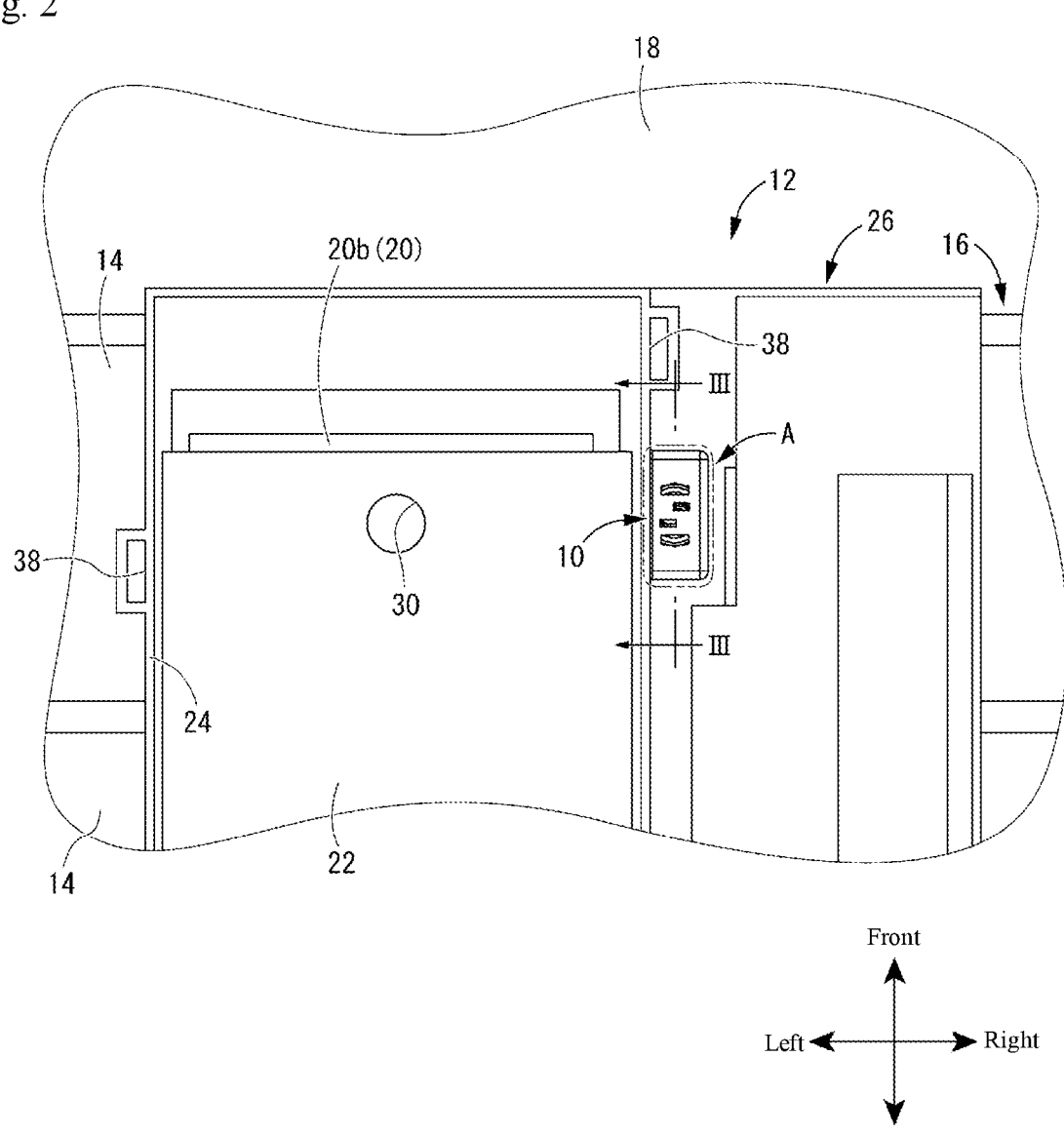
FIG. 2 is an enlarged plan view illustrating a main part of the sensor unit-equipped battery wiring module shown in FIG. 1 (except for a cover part).

First, modes for carrying out the present disclosure will be listed and described.

A sensor unit according to the present disclosure is (1) a sensor unit including: a band-shaped and flexible conductive path structure including a laminated conductor and an insulating film that covers the conductor; a sensor element that is arranged on a surface of the conductive path structure and is connected to the conductor; a lower housing including a sensor element accommodation part that surrounds the sensor element and is fixed to the surface of the conductive path structure; a coil spring configured to bias the lower housing toward a detection target; and an upper housing that is attached to the lower housing with the coil spring interposed therebetween in an axial direction of the coil spring, wherein the lower housing includes a support portion supporting an end portion of the coil spring in the axial direction, the upper housing includes a positioning protrusion that protrudes in the shape of a tapered tube toward the lower housing, and is inserted into another end of the coil spring in the axial direction, the lower housing is displaceable toward the positioning protrusion in response to an elastic deformation of the coil spring that shrinks in the axial direction, and is biased toward the detection target in response to elastic recovery of the coil spring, the other end of the coil spring has an engagement projection formed by a bare wire of the coil spring protruding to an inner circumferential side of the coil spring so as to be deflectable and deformable, the positioning protrusion has, in a base end portion thereof, a receiving recess that is open in an outer circumferential surface of the positioning protrusion and is recessed to an inner circumferential side, and in which the engagement projection is received and locked, and due to deflection and deformation of the engagement projection, the positioning protrusion is allowed to be inserted into the coil spring, and due to elastic recovery of the engagement projection, the engagement projection is received and locked in the receiving recess, and the coil spring is held by the upper housing.

With this configuration, the coil spring having a held structure in which one end portion is supported by the support portion of the lower housing, and the positioning protrusion protruding from the upper housing is inserted into the other end portion has new configurations as follows: that is, the coil spring has, at the other end portion thereof, the engagement projection formed by the bare wire of the coil spring projecting to the inner circumferential side of the coil spring and being deflectable and deformable inward in the axial direction of the coil spring, and the positioning protrusion has, in the base end portion thereof, the receiving recess that is open in the outer circumferential surface and is recessed to the inner circumferential side. As a result of the other end portion of the coil spring being externally fitted to the positioning protrusion of the upper housing, the engagement projection of the coil spring is received and locked in the receiving recess in the positioning protrusion, so that the coil spring is held by the upper housing. Accordingly, even before assembly of the coil spring of the sensor unit with the lower housing and the upper housing, the coil spring can be held by the upper housing. As a result, the likelihood that the coil spring will be lost during the sensor unit assembling process is reduced. Furthermore, since the coil spring can be held in advance by the upper housing at the time of the assembling operation, it is possible to improve the workability in assembling the sensor unit. Note that the assembly of the coil spring to the upper housing is easily executable by pressing the other end portion of the coil spring against the positioning protrusion from the protruding end side. That is to say, by pressing the coil spring against the positioning protrusion from the protruding end side, the engagement projection of the coil spring is pressed against the outer circumferential surface of the positioning protrusion and is deflected and deformed, for example, inward in the axial direction of the coil spring. With this, the positioning protrusion is allowed to be inserted into the coil spring. Furthermore, when the engagement projection of the coil spring reaches the base end portion of the positioning protrusion, the engagement projection elastically recovers, and is received and locked in the receiving recess provided in the positioning protrusion. Accordingly, the coil spring is held by the upper housing.

(2) Preferably, the engagement projection has a proximal portion extending toward the inner circumferential side of the coil spring, a curved portion that is contiguous to the proximal portion, and a distal portion that is contiguous to the curved portion and extends to an outer circumferential side of the coil spring relative to the curved portion, and the positioning protrusion has, on the outer circumferential surface, a guide surface configured to position the engagement projection in the circumferential direction of the positioning protrusion, the guide surface extending to the receiving recess for the engagement projection in an axial direction of the positioning protrusion. The engagement projection has a shape such that the proximal portion projecting to the inner circumferential side is folded via the curved portion toward the outer circumferential side with respect to the curved portion, and thus, for example, if the engagement projection is formed at a terminal of the bare wire, it is possible to advantageously suppress or prevent the occurrence of defects in which the terminal of the bare wire cuts into the outer circumferential surface of the positioning protrusion, and the operation of inserting the positioning protrusion into the other end portion of the coil spring is made difficult. Furthermore, since the outer circumferential surface of the positioning protrusion has the guide surface that positions the engagement projection in the circumferential direction and extends in the axial direction toward the receiving recess, it is possible to guide the engagement projection toward the receiving recess more reliably and smoothly, making it possible to improve the workability of inserting the positioning protrusion into the other end portion of the coil spring.

(3) Preferably, the proximal portion and the distal portion of the engagement projection extend while being inclined with respect to a radial direction of the coil spring, and the proximal portion and the distal portion protrude in a V-shape, when viewed in a plan view, from an arc-shaped portion whose central angle is 90° or less and that is included in the inner circumferential surface of the coil spring, the positioning protrusion has, on the outer circumferential surface, four of the guide surfaces in a flat surface shape that extend while being gradually widened toward the base end portion, the guide surfaces being evenly distributed on the outer circumferential surface of the positioning protrusion at four positions distanced from each other in the circumferential direction, and in the base end portion of the positioning protrusion, four of the receiving recesses that are contiguous to the guide surfaces and are open are respectively provided at four positions in the circumferential direction that correspond to the guide surfaces. Since the engagement projection projects in a V-shape, when viewed in a plan view, from the arc-shaped portion whose central angle is 90° or less and that is included in the inner circumferential surface of the coil spring, the proximal portion and the distal portion located on both sides of the midmost curved portion of the engagement projection can be pressed against the guide surface of the positioning protrusion, making it possible to reliably realize the elastic deformation of the engagement projection. Moreover, since the guide surfaces can be provided at four positions of the positioning protrusion distanced from each other in the circumferential direction, there are many directions in which the coil spring can be assembled to the positioning protrusion, making it possible to improve the assembling workability.

(4) Preferably, the positioning protrusion has, at four positions distanced from each other in the circumferential direction, four arc-shaped outer circumferential surface portions, which are protrusions from the outer circumferential surface, and the guide surfaces of the positioning protrusion are adjacent in the circumferential direction via an arc-shaped outer circumferential surface portion. The arc-shaped outer circumferential surface portions are arranged in the respective gaps in the circumferential direction between the four flat surface shaped guide surfaces provided on the positioning protrusion. With this, even when the circumferential position of the engagement projection is shifted from a guide surface, the engagement projection abutting against an arc-shaped outer circumferential surface portion is guided toward the guide surface, and the engagement projection can be advantageously guided to the correct circumferential position.

(5) Preferably, the proximal portion and the distal portion of the engagement projection extend in the radial directions of the coil spring that are orthogonal to each other, and the proximal portion and the distal portion project in an L-shape, when viewed in a plan view, from an arc-shaped portion whose central angle is 90° or less and that is included in the inner circumferential surface of the coil spring, the positioning protrusion is provided with a pair of guide recesses that extend toward the base end portion and are open in the outer circumferential surface, the pair of guide recesses being evenly distributed at two positions distanced from each other in the circumferential direction, and each guide recess has a first guide surface and a second guide surface against which the proximal portion and the distal portion of the engagement projection respectively abut, and that extend orthogonal to each other, and in the base end portion of the positioning protrusion, two receiving recesses that are contiguous to the guide recesses and are open are respectively provided at two positions in the circumferential direction that correspond to the guide recesses.

The engagement projection protrudes in an L-shape, when viewed in a plan view, from an arc-shaped portion whose central angle is 90° or less and that is included in the inner circumferential surface of the coil spring, and the proximal portion and the distal portion respectively extend the radial directions of the coil spring that are orthogonal to each other. Furthermore, the guide recesses provided in the positioning protrusion each have the first guide surface and the second guide surface against which the proximal portion and the distal portion of the engagement projection respectively abut, and that extend orthogonal to each other. Accordingly, it is possible to reliably press the proximal portion and the distal portion of the engagement projection against the first guide surface and the second guide surface of the guide recess. With this, the elastic deformation of the engagement projection inward and outward in the axial direction can be realized reliably. Moreover, since the guide surfaces can be provided at two positions of the positioning protrusion distanced from each other in the circumferential direction, there are a plurality of directions in which the coil spring can be assembled to the positioning protrusion, making it possible to improve the assembling workability.

(6) Preferably, the upper housing is arranged on the surface of the conductive path structure, and has the shape of a bottomed tube that is open to the surface, the lower housing is mounted inside the upper housing so as to be displaceable in an axial direction of the upper housing, the sensor element accommodation part is provided on a lower end side of the lower housing in an axial direction, and the support portion is provided on an upper end side of the lower housing in the axial direction, the top wall part of the upper housing is provided with the positioning protrusion protruding toward the lower housing, and a peripheral wall part of the upper housing that protrudes from a periphery of the top wall part toward the surface surrounds the coil spring over the entire length of the coil spring in the axial direction.

The upper housing has the shape of a bottomed tube that is open to the surface of the conductive path structure, and the lower housing is mounted inside thereof so as to be displaceable in the axial direction. Accordingly, since the sensor element is covered and protected by the sensor element accommodation part of the lower housing, and furthermore the lower housing is surrounded by the upper housing, it is possible to protect the sensor element from, for example, interfering with another member more advantageously. Also, due to the structure in which the upper housing and the lower housing are arranged coaxially, a downsized sensor unit in which the coil spring is received therebetween can be provided. In addition, since the peripheral wall part of the upper housing surrounds the coil spring over the entire length in the axial direction of the coil spring, it is also possible to protect the coil spring from, for example, interfering with another member, and improve the durability of the sensor unit. Furthermore, before the coil spring is held by the positioning protrusion protruding from the top wall part of the upper housing, and the lower housing is assembled to the upper housing, it is preferable that one end portion of the coil spring in the axial direction do not protrude outward in the axial direction beyond the top wall part of the upper housing. With this, during the operation of assembling the sensor unit, it is possible to prevent a loss of the coil spring and a damage of the coil spring.

(7) Preferably, the support portion provided on the upper end side of the lower housing in the axial direction has a diameter larger than the sensor element accommodation part provided on the lower end side in the axial direction, and a stepped surface is provided between the support portion and the sensor element accommodation part, the upper housing has a pair of elastic locking pieces that protrude downward in the axial direction from the top wall part while facing an outer peripheral surface of the lower housing, and are deflectable and deformable outward in a radial direction, the pair of elastic locking pieces being provided with, at lower ends thereof, a locking projection protruding inward, and the lower housing received between the pair of elastic locking pieces of the upper housing can be displaced toward the top wall part of the upper housing in response to an elastic deformation of the coil spring, and are biased toward the detection target in response to elastic recovery of the coil spring, so that a displaced end on the detection target side is defined by the stepped surface of the lower housing being locked to the locking projections of the pair of elastic locking pieces.

When the diameter of the lower housing is larger on the upper side in the axial direction (support portion) than on the lower side in the axial direction (sensor element accommodation part), the stepped surface can be formed that extends over the entire periphery of the lower housing. Also, only with the pair of elastic locking pieces holding the lower housing protruding from the top wall part, it is possible to easily realize a configuration of suitably assembling the lower housing to the upper housing in the axial direction. When the radial dimension between the locking projections of the pair of elastic locking pieces is smaller than the radial dimension of the support portion of the lower housing, it is possible to easily realize a configuration in which the locking projections of the pair of elastic locking pieces are locked to the stepped surface. Since the pair of elastic locking pieces are deflectable and deformable outward in the radial direction, when inserting the support portion of the lower housing from the lower end side (locking projection side) of the pair of elastic locking pieces, the support portion of the lower housing is allowed to be inserted toward the top wall part of the upper housing due to the deflection and deformation of the pair of elastic locking pieces outward in the radial direction. Then, when the engagement projection sliding over the outer circumferential surface of the lower housing moves beyond the stepped surface of the lower housing, the pair of elastic locking pieces elastically recover inward in the radial direction, and the locking projections are locked to the stepped surface of the lower housing. With this, a displaced end of the lower housing toward the detection target is defined, and the lower housing is mounted and held in a state in which it is displaceable with respect to the upper housing in the axial direction. By employing such a structure, it is possible to provide the sensor unit that can reliably press and hold the contact surface of the plate material to a detection target.

(8) A sensor unit-equipped battery wiring module according to the present disclosure is a sensor unit-equipped battery wiring module configured to be mounted to a battery cell group in which a plurality of battery cells are lined up, the sensor unit-equipped battery wiring module including: a plurality of busbars electrically connected to the battery cell group; an insulating case in which the plurality of busbars are received; and a cover part that is mounted on the case and covers the plurality of busbars, wherein the sensor unit according to any one of the above-described items (1) to (7) is used as a sensor unit, the case includes a sensor unit arrangement region configured to be arranged on at least one battery cell that is a detection target, and in the sensor unit arrangement region, the sensor unit is arranged in a state in which a rear surface of the conductive path structure opposite to a position at which the sensor element is mounted is accessible to the battery cell.

With this configuration, the battery wiring module to be mounted to the cell group that is a detection target is configured as a sensor unit-equipped battery wiring module equipped with the sensor unit. Also, the case of the battery wiring module includes a sensor unit arrangement region to be arranged on a battery cell that is a detection target, and the sensor unit is arranged in the sensor unit arrangement region in a state in which the plate material of the sensor unit is accessible to the battery cell. With this, just by assembling the sensor unit-equipped battery wiring module to the battery cell group from above, it is possible to bring the rear surface of the conductive path structure of the sensor unit opposite to a position at which the sensor element is mounted into contact with the battery cell that is a detection target. Note that the metal plate material may be fixed to the rear surface of the conductive path structure at the position at which the sensor element is mounted, and the contact surface of the sensor element to the battery cell may be configured by the plate material. With this, using the flatness of the plate material, the contact reliability to the battery cell can be ensured. Also, if the sensor element is a temperature sensor, reliable temperature detection of the battery cell using the heat collecting effects of the plate material is possible.

(9) Preferably, the upper housing is arranged in the sensor unit arrangement region while being open to the battery cell, and the upper housing is formed in one piece with the case. By arranging the sensor unit in the sensor unit arrangement region in a state in which the upper housing is oriented so as to be open to the battery cell, the biasing structure with the upper housing, the lower housing, and the coil spring can be used to reliably bias the rear surface of the conductive path structure opposite to a position at which the sensor element is mounted toward the battery cell. Moreover, since the upper housing is formed in one piece with the case, it is possible to improve the handling of the sensor unit-equipped battery wiring module and reduce the number of members, resulting in a reduction in a likelihood that the coil spring will be lost. As a result, the workability of assembling the sensor unit-equipped battery wiring module to the battery pack can be improved.

Details of Embodiments of Present Disclosure

The following will describe specific examples of the sensor unit and the sensor unit-equipped battery wiring module of the present disclosure with reference to the drawings. Note that the present disclosure is not limited to these examples, but rather is indicated by the scope of claims and is intended to include all modifications within a meaning and scope equivalent to the scope of claims.

Embodiment 1

A sensor unit-equipped battery wiring module 12 equipped with a sensor unit 10 according to Embodiment 1 of the present disclosure will be described with reference to FIGS. 1 to 9. The sensor unit-equipped battery wiring module 12 is mounted to a battery cell group 16 in which a plurality of battery cells 14 are lined up. Note that the sensor unit-equipped battery wiring module 12 can be arranged in any orientation, but the following description will be given using an up-down direction, a left-right direction, and a front-rear direction that are based on the up-down direction, the left-right direction, and the front-rear direction shown in the drawings. Also, when multiple members are the same, reference numerals may be given to some of the members and not to the other members.

Battery Cell Group 16

The battery cell group 16 includes the plurality of battery cells 14 lined up in a line. Note that in FIG. 1, the battery cell group 16 includes twelve battery cells 14 by way of example, but the number of battery cells 14 included in the battery cell group 16 is not limited to this. Also, the battery cell group 16 may include a plurality battery cells 14 lined up in a plurality of lines.

The plurality of battery cells 14 are lined up along a predetermined direction in a battery case 18. More specifically, the battery cells 14 each have an electrode forming surface from which a pair of positive electrode terminal 20a and negative electrode terminal 20b constituting an electrode terminal 20 protrude. Hereinafter, the electrode forming surface may be referred to as an upper surface of the corresponding battery cell 14. The plurality of battery cells 14 are lined up in the battery case 18 with the electrode forming surfaces thereof directed upward. Furthermore, the plurality of battery cells 14 are lined up such that the positive electrode terminals 20a and the negative electrode terminals 20b of adjacent battery cells 14 are alternately placed.

A not shown separator made of a resin or the like is disposed between adjacent battery cells 14, and the plurality of battery cells 14 are lined up in the battery case 18 with small gaps therebetween so that their side surfaces do not come into close contact with each other. Due to small gaps formed between adjacent battery cells 14, at least heat dissipation properties of the battery cells 14 can be ensured.

The battery cell group 16 is provided with the sensor unit-equipped battery wiring module 12, in order that the battery cells 14 are connected in parallel to each other. The sensor unit-equipped battery wiring module 12 is attached to terminal rows 20c.

Sensor Unit-Equipped Battery Wiring Module 12

As shown in FIG. 1, the sensor unit-equipped battery wiring module 12 according to Embodiment 1 of the present disclosure includes a plurality of busbars 22 that each electrically connect adjacent battery cells 14 to each other, among the plurality of battery cells 14 lined up in a line. Also, the sensor unit-equipped battery wiring module 12 includes: insulating cases 26 with a busbar receiving frame 24 that receives the plurality of busbars 22; cover parts 28 that are respectively fitted to the cases 26 and cover the plurality of busbars 22; and a sensor unit 10.

Busbar 22

The busbars 22 electrically connect the negative electrode terminal 20b of the rear-most battery cell 14 and the positive electrode terminal 20a of the front-most battery cell 14. Also, each busbar 22 electrically connects a positive electrode 20a and a negative electrode terminal 20b that are adjacent to each other. With this, the plurality of battery cells 14 are connected in series to each other.

Each busbar 22 is a conductor, for example, a plate-shaped member made of copper, and has through holes 30 in a central portion. By inserting not shown bolts into the through holes 30 and fastening the bolts, the busbar 22 can be fixed to and electrically connected to the positive electrode terminal 20a and/or the negative electrode terminal 20b.

Case 26

The cases 26 are, for example, insulating plate members made of a synthetic resin, and each have, on both sides in a width direction (left-right direction), a plurality of holes into which a positive electrode terminal 20a and a negative electrode terminal 20b of the battery cell group 16 are respectively inserted. The size of the case 26 corresponds to the surfaces of the battery cell group 16 from which the positive electrode terminals 20a or the negative electrode terminals 20b protrude. The busbar receiving frame 24 of the case 26 is a groove whose cross-section is U-shaped, and the busbars 22 are received in the groove and are placed at the bottom.

Also, a conductive path structure routing route 34 in which a conductive path structure 32 is routed (see FIG. 4) is provided on the inner side of the busbar receiving frame 24 of the case 26 in a width direction (left-right direction). The conductive path structure routing route 34 has the shape of, for example, a tube extending in the longitudinal direction, so that the conductive path structure 32 is routed inside the conductive path structure routing route 34. In addition, the case 26 includes a sensor unit arrangement region A to be arranged on a single battery cell 14 (in the present embodiment, the front-most battery cell 14), which is a detection target (see FIGS. 2 and 4).

Cover Part 28

The cover parts 28 are insulating planar plate members made of synthetic resin. Each cover part 28 has, at the outer periphery thereof, a plurality of engagement parts 36 extending downward, and the cover part 28 is fixed and attached to the corresponding case 26 when the engagement parts 36 engage with corresponding engaged parts 38 provided on the case 26 (see FIG. 1).

Sensor Unit 10

The sensor unit 10 is a unit that is placed onto a single battery cell 14, which serves as a detection target, from above. The sensor unit 10 includes the band-shaped and flexible conductive path structure 32, a sensor element 40 connected to an end of the conductive path structure 32, and a plate material 42 attached to the conductive path structure 32.

Conductive Path Structure 32

Figure 3:
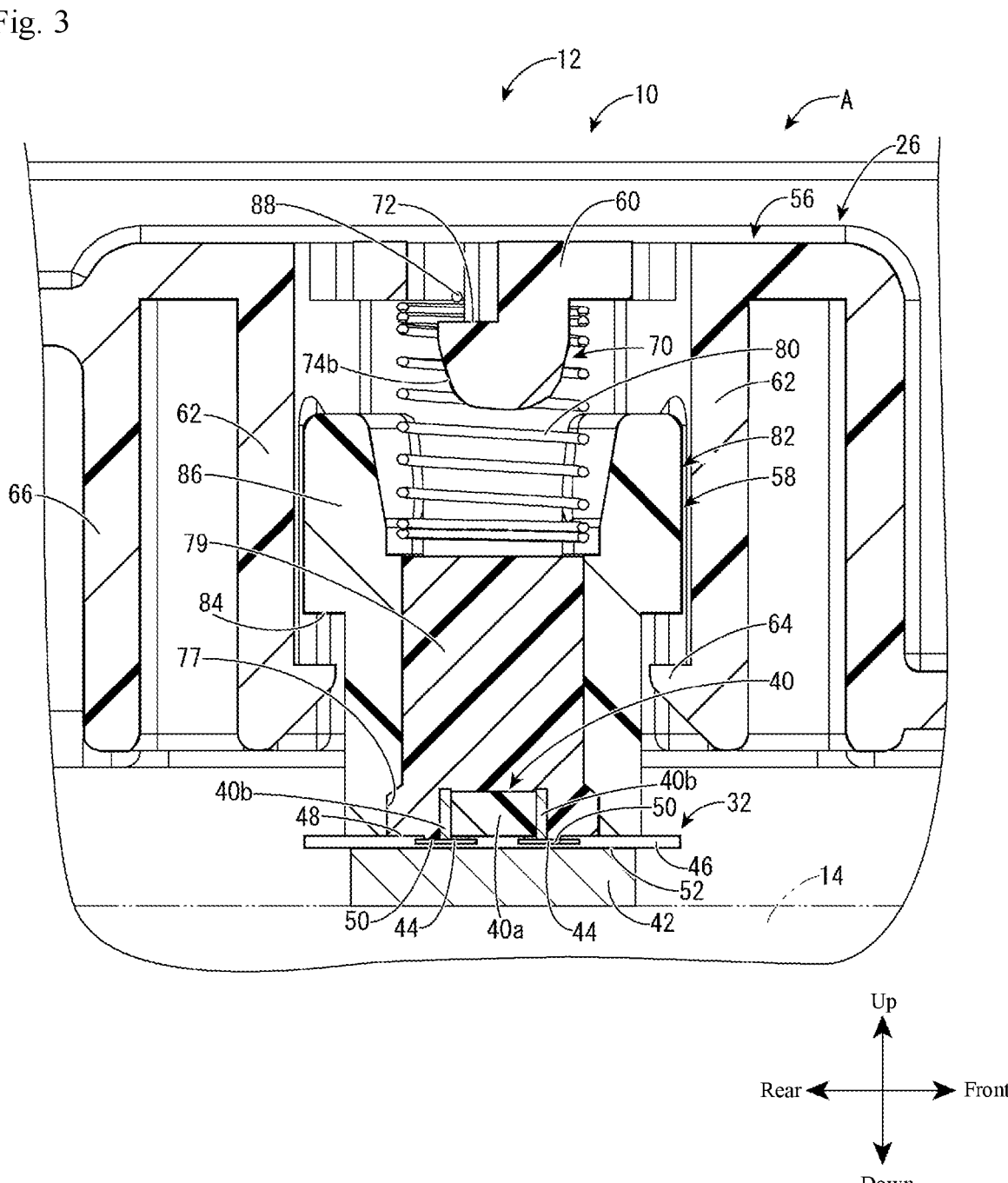
FIG. 3 is an enlarged cross-sectional view illustrating the main part taken along a line III-III in FIG. 2.
Figure 4:
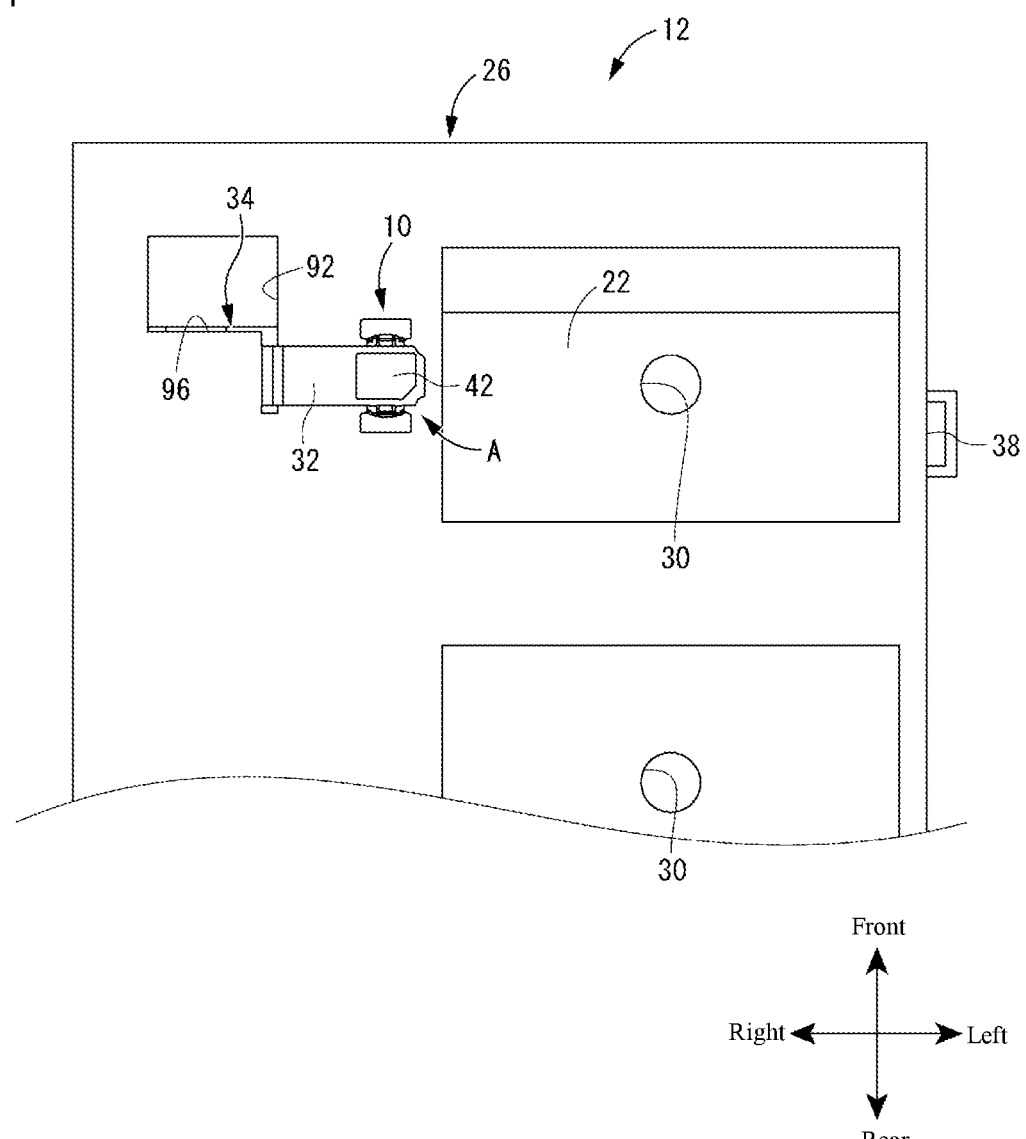
FIG. 4 is a bottom view illustrating the sensor unit-equipped battery wiring module shown in FIG. 2.
Figure 6:
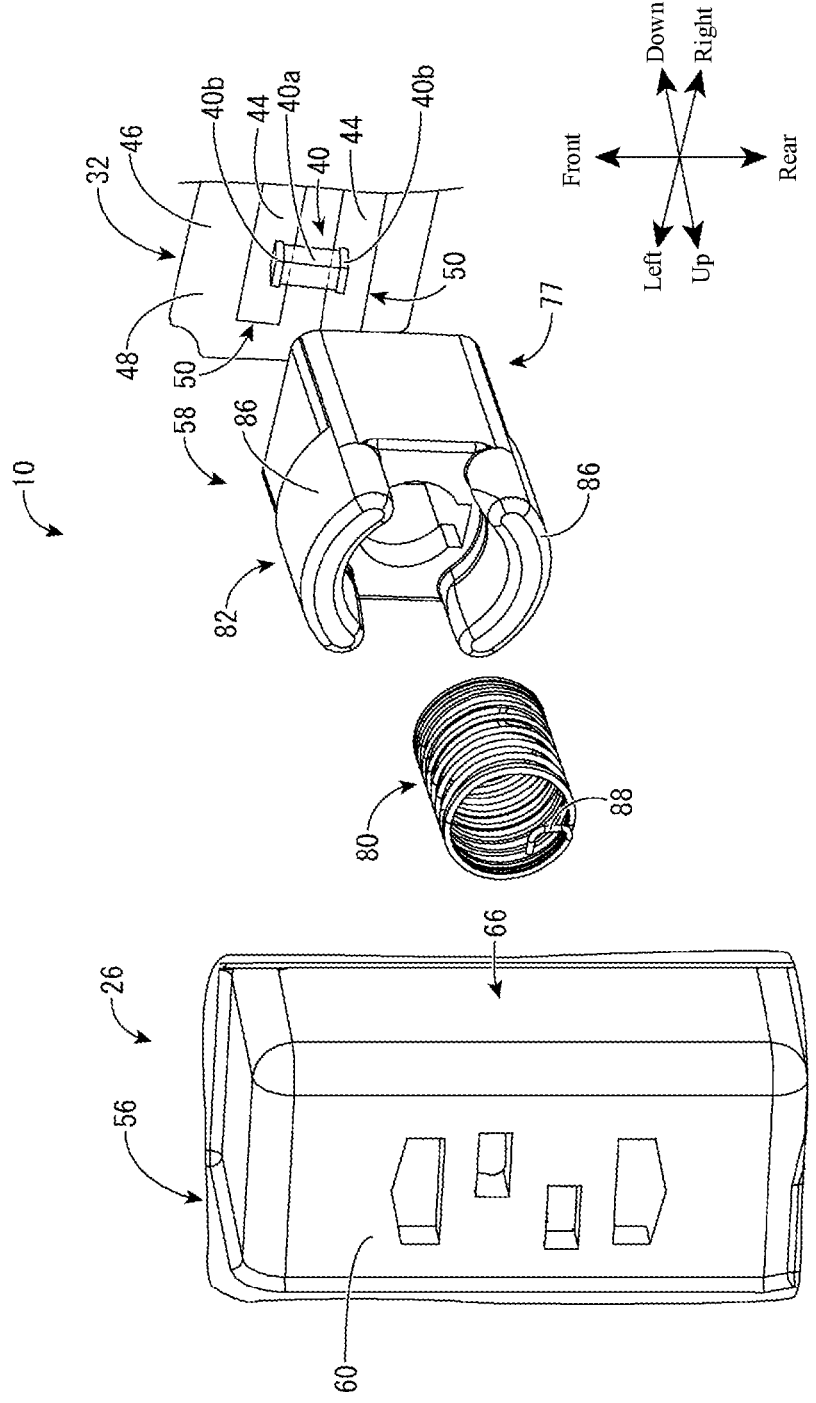
FIG. 6 is an exploded perspective view illustrating a sensor unit shown in FIG. 5.

As shown in FIGS. 3 and 6, the conductive path structure 32 is formed by covering a pair of laminated conductors 44 made of, e.g., copper foil with a band-shaped insulating film 46, which is wider than the pair of conductors 44. Accordingly, the conductive path structure 32 has a higher flexibility than covered wires and a highly space-saving configuration. A pair of connection parts 50 from which the pair of conductors 44 are exposed are formed on a surface 48, which is an upper surface at one end of the conductive path structure 32. The pair of connection parts 50 are formed by removing the insulating film 46. The other end of the conductive path structure 32 is connected to a not-shown control unit that controls the battery cell group 16.

Sensor Element 40

As shown in FIGS. 3 and 6, the sensor element 40 includes a sensor body 40a that is substantially rectangular. A pair of soldered parts 40b are provided at both ends of the sensor body 40a. The pair of soldered parts 40b are electrically connected to the pair of conductors 44 by being connected to the pair of connection parts 50 provided at the end of the conductive path structure 32 with solder or the like. Accordingly, a configuration is such that a detection signal from the sensor element 40 arranged on the surface 48 of the conductive path structure 32 is input to the control unit via the pair of conductors 44 of the conductive path structure 32. Note that any sensor such as a temperature sensor or a pressure sensor can be used as the sensor element 40. In the present embodiment, the sensor element 40 is a temperature sensor, but is not limited to this.

Plate Material 42

As shown in FIG. 3, the plate material 42 is formed as a planar plate with a high flatness. The plate material 42 is arranged on a rear surface 52 of the conductive path structure 32, and the upper surface, which is one surface, of the plate material 42 is fixed, by bonding or crimping, to a portion of the conductive path structure 32 that is opposite to the sensor element 40 in the thickness direction of the conductive path structure 32. The plate material 42 is configured by a metal plate material that is made of an aluminum, an aluminum alloy, copper, a copper alloy, or the like, and is excellent in heat transmission. The lower surface, which is the other surface, of the plate material 42 serves as a contact surface for contacting a single battery cell 14, which is a detection target. The plate material 42 is rectangular, and its corner at a lower rear end is cut off.

As shown in FIGS. 2 to 3 and 5 to 7, the sensor unit 10 includes: an upper housing 56 in the shape of a bottomed tube that is open downward; and a tubular lower housing 58 that is open upward and downward. The sensor unit 10 is arranged in the sensor unit arrangement region A of the sensor unit-equipped battery wiring module 12. In the sensor unit arrangement region A, the sensor unit 10 is in a state in which the upper housing 56 is oriented so as to be open to the battery cell 14, and the upper housing 56 is formed in one piece with the case 26 of the sensor unit-equipped battery wiring module 12.

Upper Housing 56

Figure 5:
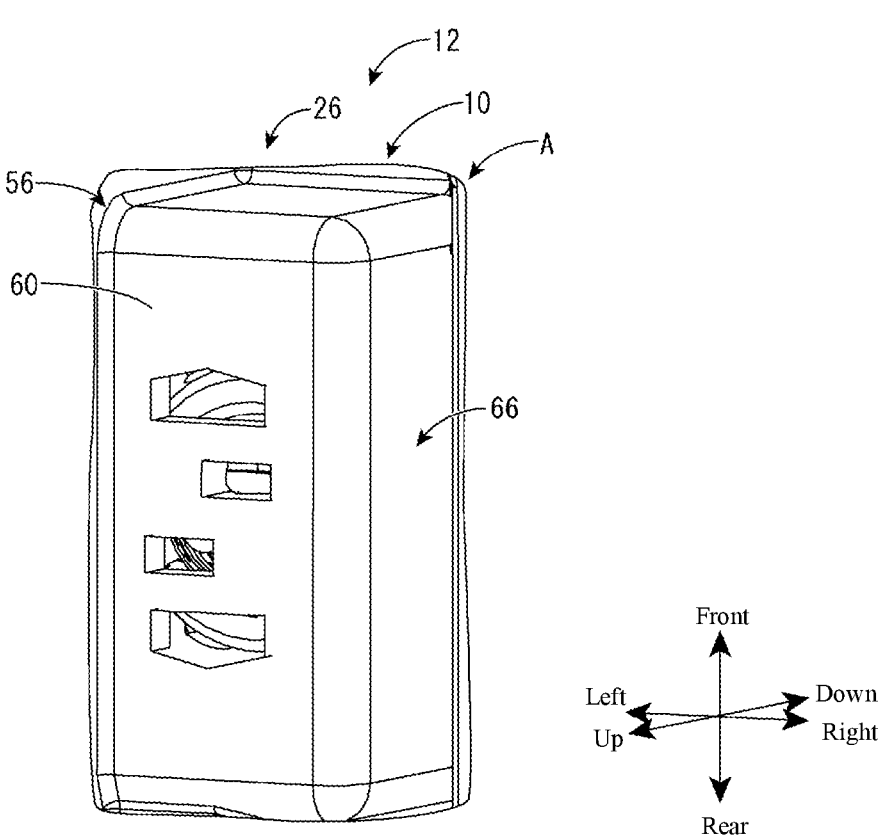
FIG. 5 is an enlarged perspective view illustrating a sensor unit arrangement region of the sensor unit-equipped battery wiring module shown in FIG. 1.
Figure 7:
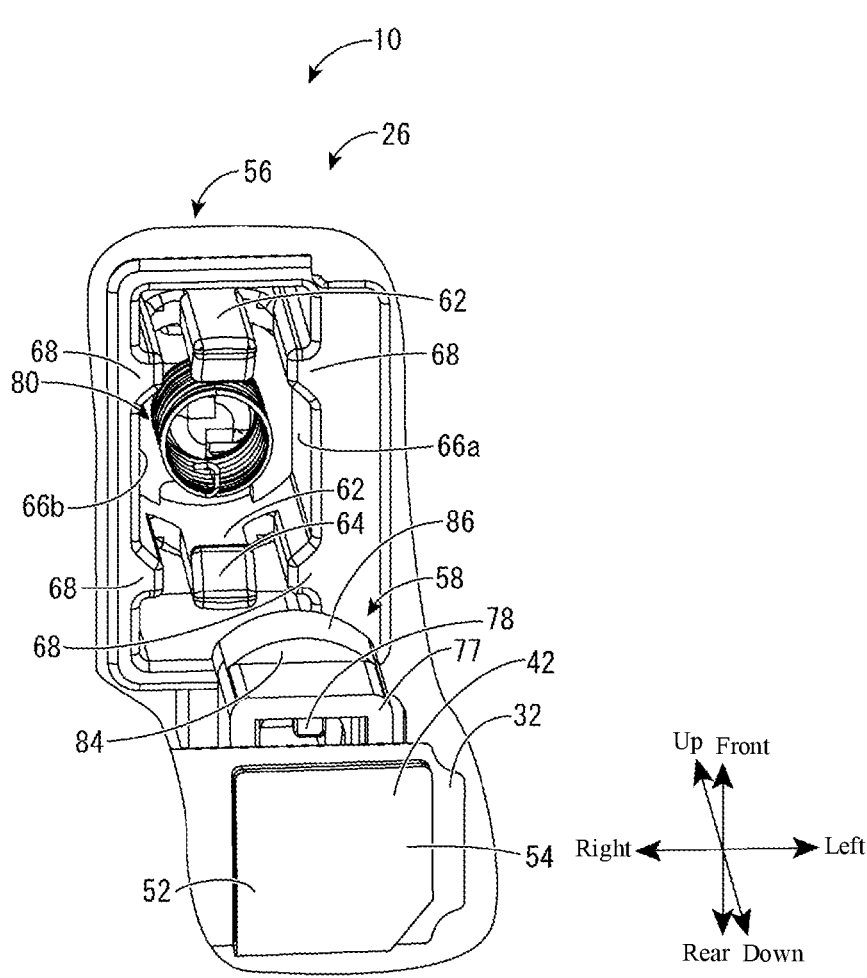
FIG. 7 is a diagram of the sensor unit shown in the exploded perspective view in FIG. 6, viewed from the bottom side.

As shown in FIG. 3, the upper housing 56 is arranged on the surface 48 of the conductive path structure 32, and is open to the surface 48. Also, the upper housing 56 has a pair of elastic locking pieces 62 that protrude downward in the axial direction from a top wall part 60 while facing the outer peripheral surface of the lower housing 58, the pair of elastic locking pieces 62 being deflectable and deformable outward in a radial direction (left-right direction in FIG. 3). Each of the pair of elastic locking pieces 62 is provided with, at the lower end thereof, a locking projection 64 that projects inward and has a substantially triangular cross-sectional shape. Furthermore, as shown in FIGS. 3, 5, and 7, a square tubular peripheral wall part 66 that protrudes from the periphery of the top wall part 60 of the upper housing 56 toward the surface 48 of the conductive path structure 32 surrounds the coil spring 80 over its entire length in the axial direction (see FIGS. 3 and 7). In addition, peripheral wall facing surfaces 66a and 66b of the peripheral wall part 66 that face each other in a short-side direction (left-right direction in FIG. 7) are provided with pairs of guide projections 68 that project toward each other and extend in the axial direction (up-down direction), the pairs of guide projections 68 being distanced from each other in the front-rear direction.

As shown in FIG. 3, the upper housing 56 has a positioning protrusion 70 that protrudes from the center of the top wall part 60 downward in the axial direction, that is, toward the upper housing 58, and is inserted into the other end (lower end) of the later-described coil spring 80 in the axial direction.

Positioning Protrusion 70

Figures 8, 9:
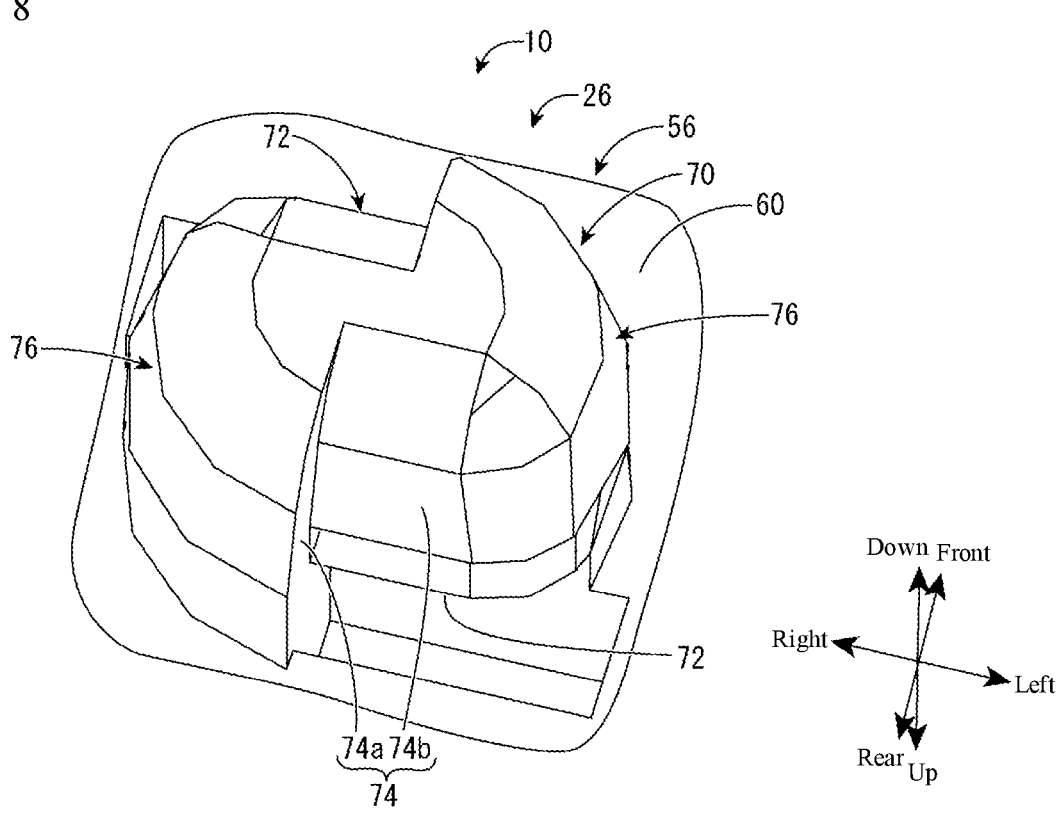
FIG. 8 is an enlarged perspective view of a positioning protrusion of an upper housing shown in FIG. 3, viewed from the bottom side.
FIG. 9 is a bottom view of the upper housing shown in FIG. 8, illustrating the positioning protrusion and a coil spring in an enlarged view.

As shown in FIGS. 3, 8, and 9, the positioning protrusion 70 includes a pair of receiving recesses 72 that are open in the outer peripheral surface of the base portion and are recessed to the inner peripheral side. The receiving recesses 72, which are open in the outer peripheral surface of the positioning protrusion 70, are respectively provided at two positions distanced in the circumferential direction. The positioning protrusion 70 has, on the outer circumferential surface thereof, guide recesses 74 extending toward the respective receiving recesses 72 in the axial direction of the positioning protrusion 70, the guide recesses 74 being configured to position a later-described engaging protrusion 88 in the circumferential direction of the positioning protrusion 70. The guide recesses 74, which are open in the outer peripheral surfaces of the positioning protrusion 70 and extend toward a base end portion, are evenly distributed on the outer circumferential surface of the positioning protrusion 70 at two positions distanced from each other in the circumferential direction. The receiving recesses 72 are contiguous to the respective guide recesses 74 and are open in the outer circumferential surface of the positioning protrusion 70. The positioning protrusion 70 has, at two positions distanced from each other in the circumferential direction, two arc-shaped outer circumferential surface portions 76, which are protrusions from the outer circumferential surface, and the guide recesses 74 of the positioning protrusion 70 adjacent in the circumferential direction are contiguous to each other via the arc-shaped outer circumferential surface portions 76 arranged therebetween. Each guide recess 74 has a first guide surface 74a and a second guide surface 74b against which a proximal portion 88a and a distal portion 88c of the later-described engagement projection 88 respectively abut, and that extend orthogonal to each other. The first guide surface 74a is a flat surface that extends in the up-down direction, which is the axial direction of the positioning protrusion 70, and in the front-rear direction orthogonal to the up-down direction. The second guide surface 74b extends toward the base end portion orthogonally to the first guide surface 74a, and has a protruding and curved shape of protruding outward in the axial direction. That is to say, the second guide surface 74b extends toward the base end portion, while expanding in the radial direction of the later-described coil spring 80.

Lower Housing 58

As shown in FIG. 3, the lower housing 58 is mounted inside the upper housing 56 in a state in which it is displaceable in the axial direction of the upper housing 56. More specifically, the lower housing 58 on the lower end side in the axial direction surrounds the sensor element 40 in the shape of a hollow tube, and the lower end surface of the lower housing 58 is fixed to the surface 48 of the conductive path structure 32 with an adhesive or the like to constitute the sensor element accommodation part 77. The sensor element accommodation part 77 has, on its inner wall, a pair of retaining protrusions 78 protruding inward (see FIG. 7). A sealing material 79 for protecting the sensor element 40 from water, dust, and the like is injected into the sensor element accommodation part 77, and as a result of the sealing material 79 being hardened, the sealing material 79 is retained by the pair of retaining protrusions 78 while covering the sensor element 40. The lower housing 58 on the upper end side in the axial direction constitutes a support portion 82 that holds the coil spring 80 capable of expanding and shrinking in the axial direction, between the facing surface of the lower housing 58 and the top wall part 60 of the upper housing 56. That is to say, the support portion 82 supports one end of the coil spring 80 in the axial direction. The coil spring 80 is a metal coil spring obtained by winding a metal wire material such as SUS in a spiral shape. Accordingly, the lower housing 58 is displaceable toward the positioning protrusion 70 of the top wall part 60 in response to an elastic deformation of the coil spring 80 that shrinks in the axial direction, and the lower housing 58 is biased toward the plate material 42, that is, the battery cell 14 in response to elastic recovery of the coil spring 80. That is to say, the coil spring 80 biases the lower housing 58 toward the battery cell 14 that serves as a detection target. Also, the lower housing 58 is assembled to the upper housing 56 with the coil spring 80 interposed therebetween in the axial direction of the coil spring 80.

The support portion 82 of the lower housing 58 provided on its upper end side in the axial direction has a diameter larger than the sensor element accommodation part 77 provided on the lower end side in the axial direction, and a stepped surface 84 is provided between the support portion 82 and the sensor element accommodation part 77. The support portion 82 has cut-off portions in the circumferential wall 86 that face each other in the left-right direction, and are cut off over the entire length in the up-down direction.

Coil Spring 80

As shown in FIGS. 3, 6, and 9, the upper end portion, which is the other end portion, of the coil spring 80 has the engagement projection 88 that projects to the inner circumferential side of the coil spring 80 and is deflectable and deformable inward in the axial direction of the coil spring 80. The engagement projection 88 has the proximal portion 88*a* extending from a terminal of the bare wire of the coil spring 80 to the inner circumferential side of the coil spring 80, a curved portion 88*b* that is contiguous to the proximal portion 88*a*, and the distal portion 88*c* that is contiguous to the curved portion 88*b* and extends toward the outer circumferential side of the coil spring 80 relative to the curved portion 88*b*. The proximal portion 88*a* and the distal portion 88*c* of the engagement projection 88 extend in the radial directions of the coil spring 80 that are orthogonal to each other, and the proximal portion 88*a* and the distal portion 88*c* protrude in an L-shape, when viewed in a plan view, from an arc-shaped portion 90 whose central angle α is 90° or less and that is included in the inner circumferential surface of the coil spring 80.

Method For Assembling Sensor Unit-Equipped Battery Wiring Module 12

The following will describe an overview of a method for assembling the sensor unit-equipped battery wiring module 12 according to Embodiment 1 of the present disclosure. First, the sensor element 40 is soldered to the pair of connection parts 50 provided on the surface 48 of the conductive path structure 32 at an end thereof. Then, the plate material 42 is fixed to the rear surface 52 of the conductive path structure 32 at one end, the plate material 42 being fixed to a position opposite to the sensor element 40. Then, the lower housing 58 is fixed to the surface 48 of the conductive path structure 32 at the end, and the sealing material 79 is injected into the sensor element accommodation part 77 and is hardened. Subsequently, the conductive path structure 32 is arranged on the conductive path structure routing route 34 provided on the surface side of the case 26. The other end of the conductive path structure 32 is connected to a connector 94, and the connector 94 is attached to the rear end of the conductive path structure routing route 34. Then, the coil spring 80 is pressed against the positioning protrusion 70 while being positioned such that the axis of the coil spring 80 is aligned with the axis of the positioning protrusion 70 of the upper housing 56 provided in the sensor unit arrangement region A. At this time, as a result of the proximal portion 88*a* and the distal portion 88*c* of the engagement projection 88 of the coil spring 80 respectively engaging with the first guide surface 74*a* and the second guide surface 74*b* of a guide recess 74 of the positioning protrusion 70, the engagement projection 88 and the coil spring 80 are positioned in the circumferential direction of the positioning protrusion 70. With this, the engagement projection 88 of the coil spring 80 is deflected and deformed inward in the axial direction of the coil spring 80, and the coil spring 80 is allowed to be externally fitted to the positioning protrusion 70. Then, the engagement projection 88 of the coil spring 80 is guided by the guide recess 74 and reaches the receiving recess 72. As a result, the engagement projection 88 elastically recovers, and is received and locked in the receiving recess 72, so that the coil spring 80 is held by the positioning protrusion Then, one end of the conductive path structure 32 is moved toward the rear surface of the case 26 through an opening 92 and a slit 96 provided in the case 26. Then, the support portion 82 of the lower housing 58 is inserted between the pair of elastic locking pieces 62 of the upper housing 56 that is open to the rear surface of the case 26. With this, the pair of elastic locking pieces 62 are elastically deformed outward in the radial direction, and allow the support portion 82 to be inserted therebetween. After the insertion of the support portion 82, the pair of elastic locking pieces 62 elastically recover and the stepped surface 84 of the lower housing 58 is locked to the locking projections 64 of the pair of elastic locking pieces 62. That is to say, a displaced end on the plate material 42 side is defined as a result of the stepped surface 84 of the lower housing 58 being locked to the locking projections 64 of the pair of elastic locking pieces 62.

Then, the case 26 having such a configuration is assembled to the battery cell group 16. As a result, as shown in FIG. 3, the plate material 42 is brought into contact with the surface of the battery cell 14 and the lower housing 58 is pressed upward, and thus the coil spring 80 biases the lower housing 58 downward. That is to say, in the sensor unit arrangement region A, the sensor unit 10 is arranged in a state in which the plate material 42 is accessible to the battery cell 14, and the sensor unit 10 is pressed against the battery cell 14 by the coil spring 80. That is to say, the sensor unit 10 includes the coil spring 80 that biases the plate material 42 toward the battery cell 14 that is the detection target. Ultimately, the busbar 22 and the cover part 28 are attached to the case 26, and the sensor unit-equipped battery wiring module 12 is complete.

According to the sensor unit 10 of the present disclosure having such a configuration, one end portion of the coil spring 80 is supported by the support portion 82 of the lower housing 58, and the other end of the coil spring 80 is held by the positioning protrusion 70 protruding from the upper housing 56. That is to say, the coil spring 80 has, at the other end portion thereof, the engagement projection 88 that projects to the inner circumferential side of the coil spring 80 and is deflectable and deformable, for example, inward in the axial direction of the coil spring 80. As a result of the engagement projection 88 being received and locked in the receiving recess 72 provided in the positioning protrusion 70, the coil spring 80 is held by the upper housing 56. With this, even before assembly of the lower housing 58 and the upper housing 56 constituting the sensor unit 10, the coil spring 80 can be held by the upper housing 56. Therefore, the method for assembling sensor unit 10 reduces the likelihood that the coil spring 80 will be lost. Also, since the coil spring 80 can be held in advance by the upper housing 56 at the time of the assembling operation, it is possible to improve the workability in assembling the sensor unit 10. Note that the assembly of the coil spring 80 to the upper housing 56 is easily executable by pressing the other end portion of the coil spring 80 against the protruding end of the positioning protrusion 70. That is to say, by pressing the coil spring 80 against the positioning protrusion 70 from the protruding end side, the engagement projection 88 of the coil spring 80 is pressed against the outer circumferential surface of the positioning protrusion 70 and is deflected and deformed inward in the axial direction of the coil spring 80. With this, the positioning protrusion 70 is allowed to be inserted into the coil spring 80. Furthermore, when the engagement projection 88 of the coil spring 80 reaches the base end portion of the positioning protrusion 70, the engagement projection 88 elastically recovers, and is received and locked in the receiving recess 72 provided in the positioning protrusion 70. Accordingly, the coil spring 80 is held with respect to the upper housing 56.

The engagement projection 88 has a shape such that the proximal portion 88a projecting to the inner circumferential side is folded via the curved portion 88b toward the outer circumferential side with respect to the curved portion 88b. With this, even when the engagement projection 88 is formed at a terminal of the bare wire of the coil spring 80 as in the present embodiment, it is possible to prevent the terminal of the bare wire from cutting into the outer circumferential surface of the positioning protrusion 70. Accordingly, it is possible to advantageously suppress or prevent the occurrence of defects that make the operation of inserting the other end portion of the coil spring 80 into a receiving recess 72 of the positioning protrusion 70 difficult. Furthermore, since the outer circumferential surface of the positioning protrusion 70 has the guide recesses 74 each having the first guide surface 74a and the second guide surface 74b that position the engagement projection 88 and extend in the axial direction toward the receiving recess 72, it is possible to guide the engagement projection 88 toward the receiving recess 72 more reliably and smoothly. With this, it is possible to improve the workability of inserting the other end portion of the coil spring 80 into the positioning protrusion 70.

The engagement projection 88 protrudes in an L-shape, when viewed in a plan view, from an arc-shaped portion 90 whose central angle α is 90° or less and that is included in the inner circumferential surface of the coil spring 80, and the proximal portion 88a and the distal portion 88c of the engagement projection 88 respectively extend the radial directions of the coil spring 80 that are orthogonal to each other. Also, the guide recesses 74 provided in the positioning protrusion 70 each have the first guide surface 74a and the second guide surface 74b against which the proximal portion 88a and the distal portion 88c of the engagement projection 88 respectively abut, and that extend orthogonal to each other. With this, it is possible to reliably press the proximal portion 88a and the distal portion 88c of the engagement projection 88 against the first guide surface 74a and the second guide surface 74b of a guide recess 74. Therefore, the elastic deformation of the engagement projection 88 inward in the axial direction can be realized reliably. Moreover, since it is possible to provide the guide recesses 74 at two positions distanced from each other in the circumferential direction of the positioning protrusion 70, there are a plurality of directions in which the coil spring 80 can be assembled to the positioning protrusion 70, making it possible to improve the assembling workability. Particularly, the second guide surface 74b has a protruding and curved structure of protruding outward in the axial direction, and extends toward the base end portion of the positioning protrusion 70. Therefore, the distal portion 88c of the engagement projection 88 is deflected and deformed outward in the radial direction as it is pressed toward the base end portion, making it easier to press the coil spring 80 against the positioning protrusion 70.

The upper housing 56 has the shape of a bottomed tube, and the lower housing 58 is mounted inside thereof so as to be displaceable in the axial direction. With this, since the sensor element 40 is covered and protected by the sensor element accommodation part 77 of the lower housing 58, and furthermore the lower housing 58 is surrounded by the upper housing 56, it is possible to protect the sensor element 40 from, for example, interfering with another member more advantageously. Also, due to the structure in which the upper housing 56 and the lower housing 58 are arranged coaxially, a downsized sensor unit 10 in which the coil spring 80 is received therebetween can be provided. Furthermore, since the peripheral wall part 66 of the upper housing 56 surrounds the coil spring 80 over the entire length in the axial direction of the coil spring 80, it is also possible to protect the coil spring 80 from, for example, interfering with another member, and improve the durability of the sensor unit 10. In addition, the coil spring 80 is surrounded by the peripheral wall part 66 of the upper housing 56 in a state in which the coil spring 80 is held by the positioning protrusion 70 of the upper housing 56. With this, during the operation of assembling the sensor unit 10, it is possible to prevent a loss of the coil spring 80 and a damage of the coil spring 80.

When the diameter of the lower housing 58 is larger on the upper side in the axial direction (support portion 82 side) than on the lower side in the axial direction (sensor element accommodation part 77 side), the stepped surface 84 is formed that extends over the entire periphery of the lower housing 58. Only with the pair of elastic locking pieces 62 of the upper housing 56 protruding from the top wall part 60, it is possible to easily realize a configuration of suitably assembling and holding the lower housing 58 to the upper housing 56 in the axial direction. When the radial dimension between the locking projections 64 of the pair of elastic locking pieces 62 is smaller than the radial dimension of the support portion 82 of the lower housing 58, it is possible to easily realize a configuration in which the locking projections 64 of the pair of elastic locking pieces 62 are locked to the stepped surface 84. By employing such a structure, it is possible to provide the sensor unit 10 that can reliably press and hold the contact surface of the plate material 42 to the battery cell 14 that is a detection target.

The battery wiring module to be mounted to the cell group 16 that is a detection target is configured as a sensor unit-equipped battery wiring module 12 equipped with the sensor unit 10. The case 26 of the sensor unit-equipped battery wiring module 12 includes a sensor unit arrangement region A that is arranged on the battery cell 14 that is a detection target. In the sensor unit arrangement region A, the sensor unit 10 is arranged in a state in which the plate material 42 of the sensor unit 10 is accessible to the battery cell 14. With this, just by assembling the sensor unit-equipped battery wiring module 12 to the battery cell group 16 from above, it is possible to bring the contact surface of the plate material 42 of the sensor unit 10 into contact with the battery cell 14 that is a detection target. Note that the metal plate material 42 is fixed to the rear surface 52 of the conductive path structure 32 opposite to a position at which the sensor element 40 is mounted, and the contact surface of the sensor element 40 to the battery cell 14 is configured by the plate material 42. With this, using the flatness of the plate material 42, the contact reliability to the battery cell 14 can be ensured. Also, in the present embodiment, since the sensor element 40 is configured by a temperature sensor, reliable temperature detection of the battery cell 14 using the heat collecting effects of the plate material 42 is possible.

The upper housing 56 is arranged in the sensor unit arrangement region A so as to be open to the battery cell 14. With this, the biasing structure with the upper housing 56, the lower housing 58, and the coil spring 80 can be used to realize a state in which the rear surface 52 of the conductive path structure 32 opposite to a position at which the sensor element 40 is mounted is reliably biased toward the battery cell 14 that is a detection target. Moreover, since the upper housing 56 is formed in one piece with the case 26, it is possible to improve the handling of the sensor unit-equipped battery wiring module 12 and reduce the number of members, thereby reducing the likelihood that the coil spring 80 will be lost. As a result, the workability of assembling the sensor unit-equipped battery wiring module 12 to the battery cell group 16 (battery pack) can be improved.

OTHER EMBODIMENTS

The technology described herein is not limited to the embodiments described above and illustrated in the drawings, and for example, the following embodiments are also included in the technical scope of the technology described herein.

Figures 10, 11:
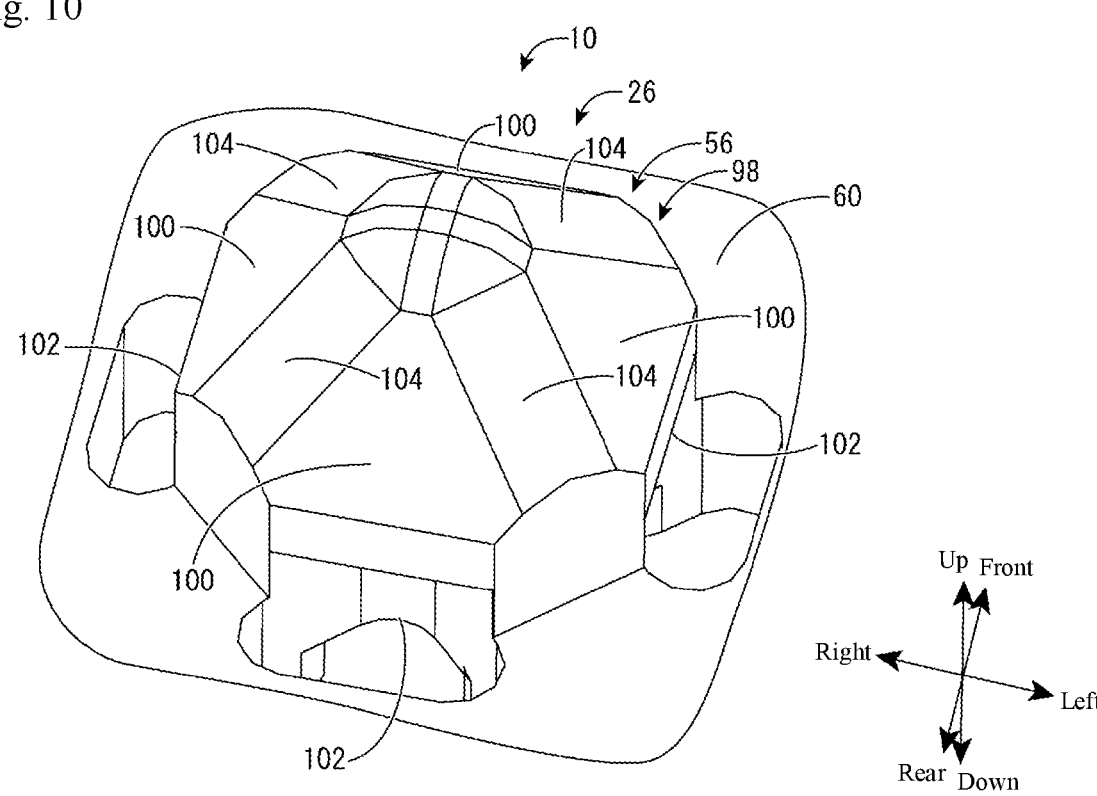
FIG. 10 is an enlarged perspective view illustrating a positioning protrusion of a sensor unit according to Embodiment 2, corresponding to FIG. 8.
FIG. 11 is a bottom view of an upper housing shown in FIG. 10, corresponding to FIG. 9.

(1) In Embodiment 1 above, the engagement projection 88 of the coil spring 80 protrudes in an L-shape, when viewed in a plan view, from an arc-shaped portion 90 whose central angle α is 90° or less, and the guide recesses 74 of the positioning protrusion 70 are evenly distributed at two positions distanced from each other in the circumferential direction, but the present invention is not limited to the configurations. As in the case of a positioning protrusion 98 of Embodiment 2 of the present disclosure shown in FIGS. 10 and 11, a proximal portion 101a and a distal portion 101c of an engagement projection 101 may extend while being inclined with respect to the radial direction of the coil spring 80, and the proximal portion 101a and the distal portion 101c may protrude in a V-shape, when viewed in a plan view, from the arc-shaped portion 90 whose central angle is 90° or less and that is included in the inner circumferential surface of the coil spring 80. Similar to Embodiment 1, the engagement projection 101 has the proximal portion 101a extending to the inner circumferential side of the coil spring 80, a curved portion 101b that is continuous with the proximal portion 101a, and the distal portion 101c that is continuous with the curved portion 101b and extends to the outer circumferential side of the coil spring 80 relative to the curved portion 101b. In Embodiment 2, the proximal portion 101a and the distal portion 101c extend while being inclined with respect to the radial direction of the coil spring 80. On the outer circumferential surface of the positioning protrusion 98, guide surfaces 100 in a flat surface shape extending while being gradually widened toward the base end portion are evenly distributed on the outer circumferential surface of the positioning protrusion 98 at four positions distanced from each other in the circumferential direction. In the base end portion of the positioning protrusion 98, four receiving recesses 102 that are continuous with the guide surfaces 100 and are open are respectively provided at four positions in the circumferential direction that correspond to the guide surfaces 100. Furthermore, the positioning protrusion 98 has, at four positions distanced from each other in the circumferential direction, four arc-shaped outer circumferential surface portions 104, which are protrusions from the outer circumferential surface, and the guide surfaces 100 of the positioning protrusion 98 adjacent in the circumferential direction are contiguous to each other via the arc-shaped outer circumferential surface portions 104 arranged therebetween.

In Embodiment 2 of the present disclosure, since the engagement projection 101 protrudes in a V-shape, when viewed in a plan view, from the arc-shaped portion 90 whose central angle is 90° or less and that is included in the inner circumferential surface of the coil spring 80, the proximal portion 101a and the distal portion 101c located on both sides of the midmost curved portion 101b of the engagement projection 101 can be pressed against the guide surface 100 of the positioning protrusion 98, making it possible to reliably realize the elastic deformation of the engagement projection 101 inward in the axial direction of the coil spring 80. Moreover, since the guide surfaces 100 can be provided at four positions of the positioning protrusion 98 distanced from each other in the circumferential direction, there are many directions in which the coil spring 80 can be assembled to the positioning protrusion 98, making it possible to improve the assembling workability. The arc-shaped outer circumferential surface portions 104 are arranged in the respective gaps between the four flat surface shaped guide surfaces 100 provided on the positioning protrusion 98 in the circumferential direction. With this, even when the circumferential position of the engagement projection 88 is shifted from a guide surface 100, the engagement projection 88 abutting against an arc-shaped outer circumferential surface portion 104 is guided toward the guide surface 100, and the engagement projection 88 can be advantageously guided to the correct circumferential position.

(2) In Embodiments 1 and 2, the descriptions have been given taking the metal coil spring obtained by winding a metal wire material in a spiral shape as an example of the coil spring 80, but the present invention is not limited to this. The coil spring 80 may also be made of a synthetic resin.

(3) In Embodiments 1 and 2 above, the engagement projection 88, 101 of the coil spring 80 is provided at a terminal of the bare wire of the coil spring 80, but a configuration is also possible in which an engagement projection is provided on the front side of the terminal, and the engagement projection is configured without any terminal.

(4) In Embodiments 1 and 2 above, the positioning protrusion 70, 98 is provided with, on the outer circumferential surface thereof, the guide recesses 74 in a specific shape, and the guide surfaces 100, but a configuration is also possible in which the positioning protrusion has a conical shape without any guide recess in a specific shape and any guide surface on the outer circumferential surface. Also, an engagement projection of the coil spring 80 may have any shape as long as it is deflected and deformed to allow the positioning protrusion to be inserted into the coil spring 80.

LIST OF REFERENCE NUMERALS

10 Sensor unit (Embodiment 1)
12 Sensor unit-equipped battery wiring module
14 Battery cell (detection target)
16 Battery cell group
18 Battery case
20 Electrode terminal
20*a* Positive electrode terminal
20*b* Negative electrode terminal
20*c* Terminal row
22 Busbar
24 Busbar receiving frame
26 Case
28 Cover
30 Through hole
32 Conductive path structure
34 Conductive path structure routing route
36 Engagement portion
38 Engaged part
40 Sensor element
40*a* Sensor body
40*b* Soldered part
42 Plate material
44 Conductor
46 Insulating film
48 Surface
50 Connection part
52 Rear surface
56 Upper housing
58 Lower housing
60 Top wall part
62 Elastic locking piece
64 Locking projection
66 Peripheral wall part
66*a* Peripheral wall facing surface
66*b* Peripheral wall facing surface
68 Guide projection
70 Positioning protrusion
72 Receiving recess
74 Guide recess
74*a* First guide surface
74*b* Second guide surface
76 Arc-shaped outer circumferential surface portion
77 Sensor element accommodation part
78 Retaining protrusion
79 Sealing material
80 Coil spring
82 Support portion
84 Stepped surface
86 Peripheral wall part
88 Engagement projection
88*a* Proximal portion
88*b* Curved portion
88*c* Distal portion
90 Arc-shaped portion
92 Opening
94 Connector
96 Slit
98 Positioning protrusion

100 Guide surface
101 Engagement projection
101*a* Proximal portion
101*b* Curved portion
101*c* Distal portion
102 Receiving recess
104 Arc-shaped outer circumferential surface portion
A Sensor unit arrangement region

The invention claimed is:

1. A sensor unit comprising:
a band-shaped and flexible conductive path structure including a laminated conductor and an insulating film that covers the conductor;
a sensor element that is arranged on a surface of the conductive path structure and is connected to the conductor;
a lower housing including a sensor element accommodation part that surrounds the sensor element and is fixed to the surface of the conductive path structure;
a coil spring configured to bias the lower housing toward a detection target; and
an upper housing that is attached to the lower housing with the coil spring interposed therebetween in an axial direction of the coil spring,
wherein the lower housing includes a support portion supporting an end portion of the coil spring in the axial direction,
the upper housing includes a positioning protrusion that protrudes in the shape of a tapered tube toward the lower housing, and is inserted into another end portion of the coil spring in the axial direction,
the lower housing is displaceable toward the positioning protrusion in response to an elastic deformation of the coil spring that shrinks in the axial direction, and is biased toward the detection target in response to elastic recovery of the coil spring,
the other end portion of the coil spring has an engagement projection formed by a bare wire of the coil spring protruding to an inner circumferential side of the coil spring so as to be deflectable and deformable,
the positioning protrusion has, in a base end portion thereof, a receiving recess that is open in an outer circumferential surface of the positioning protrusion and is recessed to an inner circumferential side, and in which the engagement projection is received and locked, and
due to deflection and deformation of the engagement projection, the positioning protrusion is allowed to be inserted into the coil spring, and due to elastic recovery of the engagement projection, the engagement projection is received and locked in the receiving recess, and the coil spring is held by the upper housing.

2. The sensor unit according to claim 1,
wherein the engagement projection has a proximal portion extending toward the inner circumferential side of the coil spring, a curved portion that is contiguous to the proximal portion, and a distal portion that is contiguous to the curved portion and extends to an outer circumferential side of the coil spring relative to the curved portion, and
the positioning protrusion has, on the outer circumferential surface, a guide surface configured to position the engagement projection in the circumferential direction of the positioning protrusion, the guide surface extending to the receiving recess for the engagement projection in an axial direction of the positioning protrusion.

3. The sensor unit according to claim 2,
wherein the proximal portion and the distal portion of the engagement projection extend while being inclined with respect to a radial direction of the coil spring, and the proximal portion and the distal portion protrude in a V-shape, when viewed in a plan view, from an arc-shaped portion whose central angle is 90° or less and that is included in the inner circumferential surface of the coil spring,
the positioning protrusion has, on the outer circumferential surface, four of the guide surfaces in a flat surface shape that extend while being gradually widened toward the base end portion, the guide surfaces being evenly distributed on the outer circumferential surface of the positioning protrusion at four positions distanced from each other in the circumferential direction, and
in the base end portion of the positioning protrusion, four of the receiving recesses that are contiguous to the guide surfaces and are open are respectively provided at four positions in the circumferential direction that correspond to the guide surfaces.

4. The sensor unit according to claim 3,
wherein the positioning protrusion has, at four positions distanced from each other in the circumferential direction, four arc-shaped outer circumferential surface portions, which are protrusions from the outer circumferential surface, and the guide surfaces of the positioning protrusion are adjacent in the circumferential direction via an arc-shaped outer circumferential surface portion.

5. The sensor unit according to claim 2,
wherein the proximal portion and the distal portion of the engagement projection extend in the radial directions of the coil spring that are orthogonal to each other, and the proximal portion and the distal portion project in an L-shape, when viewed in a plan view, from an arc-shaped portion whose central angle is 90° or less and that is included in the inner circumferential surface of the coil spring,
the positioning protrusion is provided with a pair of guide recesses that extend toward the base end portion and are open in the outer circumferential surface, the pair of guide recesses being evenly distributed at two positions distanced from each other in the circumferential direction, and
each guide recess has a first guide surface and a second guide surface against which the proximal portion and the distal portion of the engagement projection respectively abut, and that extend orthogonal to each other, and
in the base end portion of the positioning protrusion, two receiving recesses that are contiguous to the guide recesses and are open are respectively provided at two positions in the circumferential direction that correspond to the guide recesses.

6. The sensor unit according to claim 1,
wherein the upper housing is arranged on the surface of the conductive path structure, and has the shape of a bottomed tube that is open to the surface,
the lower housing is mounted inside the upper housing so as to be displaceable in an axial direction of the upper housing,
the sensor element accommodation part is provided on a lower end side of the lower housing in an axial direction, and the support portion is provided on an upper end side of the lower housing in the axial direction,
a top wall part of the upper housing is provided with the positioning protrusion protruding toward the lower housing, and
a peripheral wall part of the upper housing that protrudes from a periphery of the top wall part toward the surface surrounds the coil spring over the entire length of the coil spring in the axial direction.

7. The sensor unit according to claim 6,
wherein the support portion provided on the upper end side of the lower housing in the axial direction has a diameter larger than the sensor element accommodation part provided on the lower end side in the axial direction, and a stepped surface is provided between the support portion and the sensor element accommodation part,
the upper housing has a pair of elastic locking pieces that protrude downward in the axial direction from the top wall part while facing an outer peripheral surface of the lower housing, and are deflectable and deformable outward in a radial direction, the pair of elastic locking pieces being provided with, at lower ends thereof, a locking projection protruding inward, and
the lower housing received between the pair of elastic locking pieces of the upper housing can be displaced toward the top wall part of the upper housing in response to an elastic deformation of the coil spring, and are biased toward the detection target in response to elastic recovery of the coil spring, so that a displaced end on the detection target side is defined by the stepped surface of the lower housing being locked to the locking projections of the pair of elastic locking pieces.

8. A sensor unit-equipped battery wiring module configured to be mounted to a battery cell group in which a plurality of battery cells are lined up, the sensor unit-equipped battery wiring module comprising:
a plurality of busbars electrically connected to the battery cell group;
an insulating case in which the plurality of busbars are received; and
a cover part that is mounted on the case and covers the plurality of busbars,
wherein the sensor unit according to claim 1 is used as a sensor unit,
the case includes a sensor unit arrangement region configured to be arranged on at least one battery cell that is a detection target, and
in the sensor unit arrangement region, the sensor unit is arranged in a state in which a rear surface of the conductive path structure opposite to a position at which the sensor element is mounted is accessible to the battery cell.

9. The sensor unit-equipped battery wiring module according to claim 8,
wherein the upper housing is arranged in the sensor unit arrangement region while being open to the battery cell, and the upper housing is formed in one piece with the case.

* * * * *